March 15, 1955

F. W. LIVERMONT 2,703,976

CALIBRATION APPARATUS FOR TORQUE
WRENCHES AND CABLE TENSIOMETERS

Filed Aug. 13, 1951

INVENTOR.
Frank W. Livermont
BY
Lyon & Lyon
ATTORNEYS

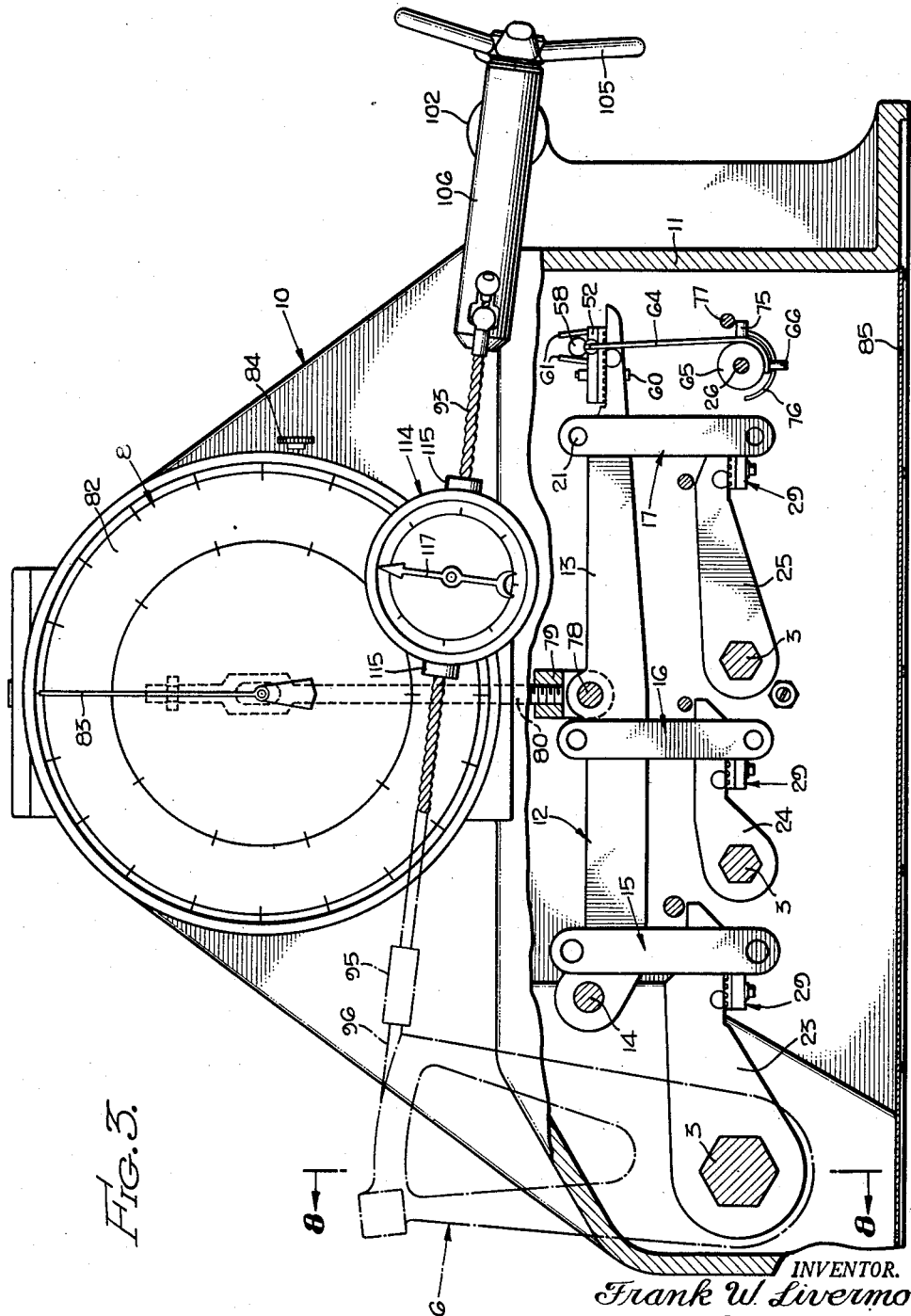

March 15, 1955
F. W. LIVERMONT
2,703,976
CALIBRATION APPARATUS FOR TORQUE
WRENCHES AND CABLE TENSIOMETERS
Filed Aug. 13, 1951
5 Sheets-Sheet 3
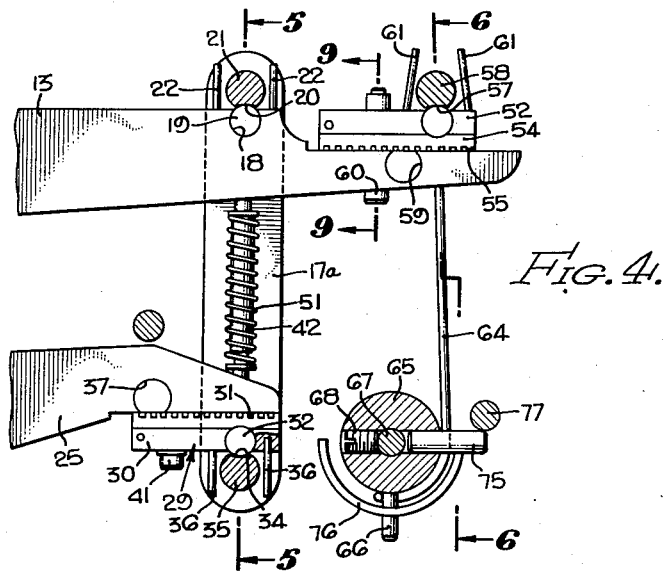
Fig. 4.
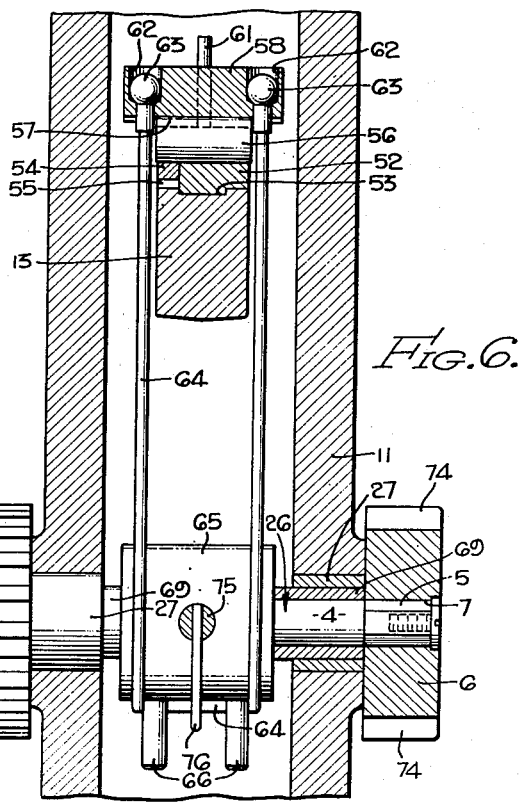
Fig. 6.
Fig. 5.
INVENTOR.
Frank W. Livermont
BY
Lyon & Lyon
ATTORNEYS

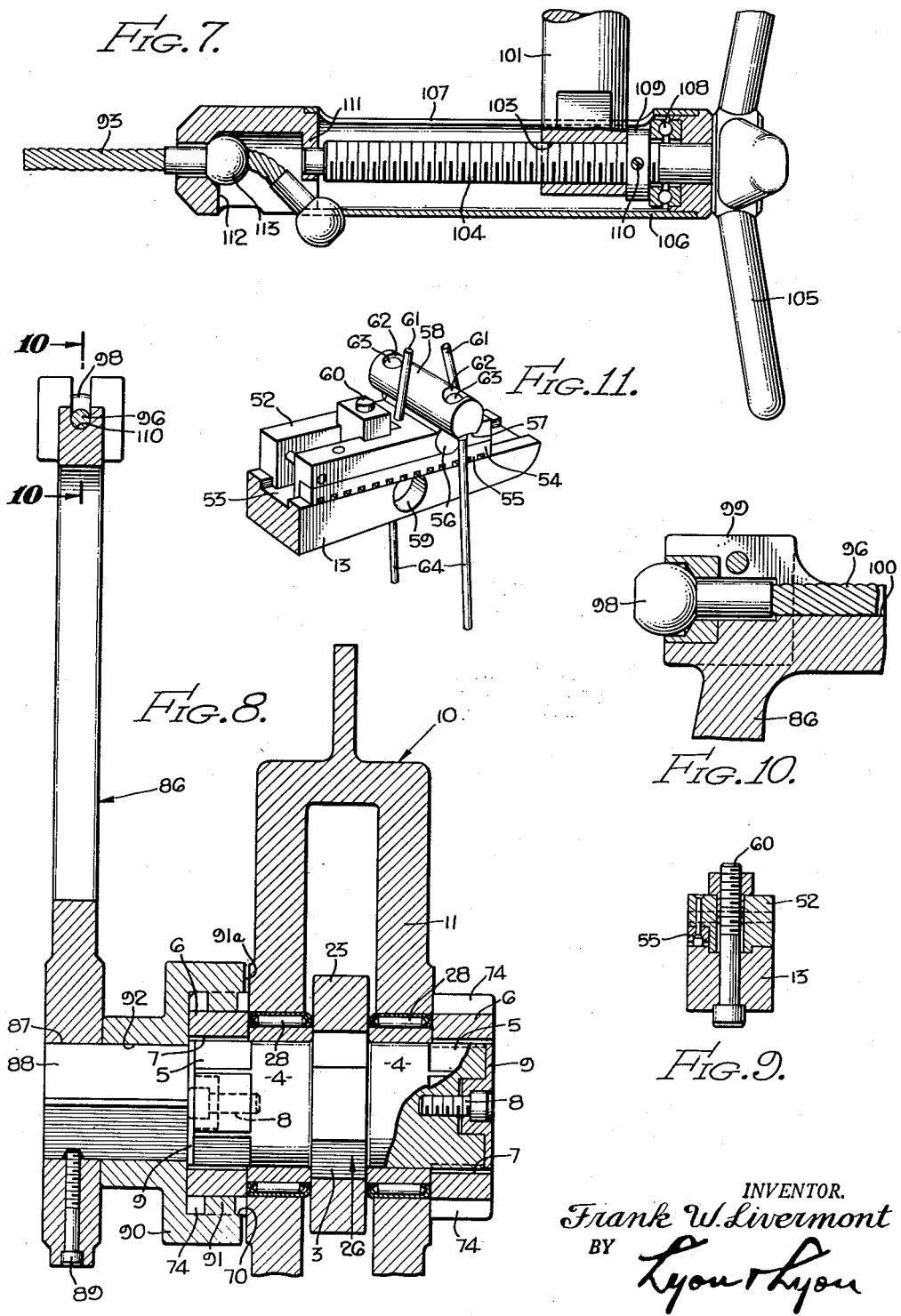

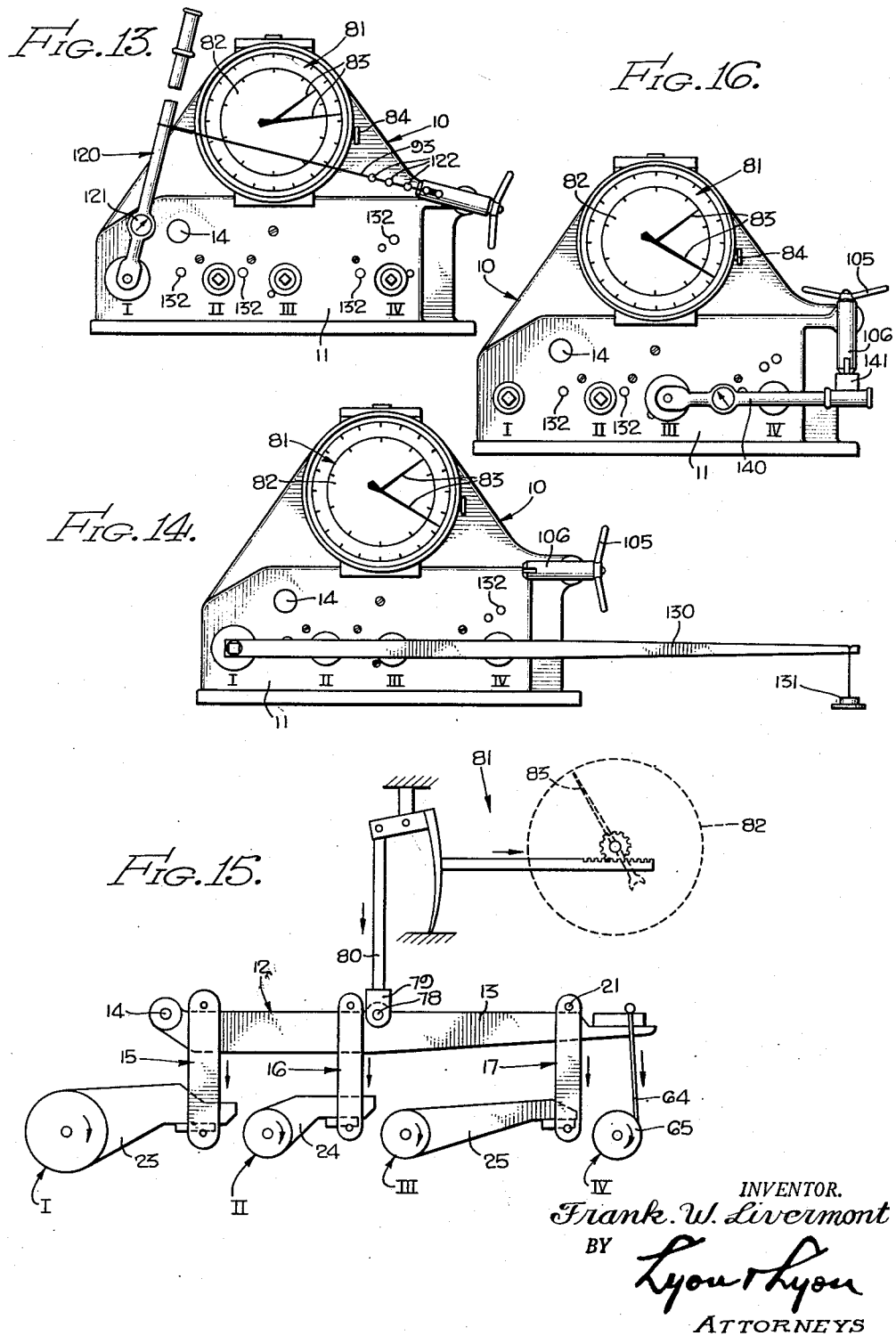

United States Patent Office 2,703,976
Patented Mar. 15, 1955

2,703,976

CALIBRATION APPARATUS FOR TORQUE WRENCHES AND CABLE TENSIOMETERS

Frank W. Livermont, Duarte, Calif., assignor to Richmont, Inc., Los Angeles, Calif., a corporation of California Application August 13, 1951, Serial No. 241,600

20 Claims. (Cl. 73—1)

This invention relates to apparatus for testing and calibrating torque indicating wrenches, torque measuring wrenches, and also for testing and calibrating cable tensiometers.

The general objects of this invention are to provide an improved form of device for bench checking and accuracy testing of torque wrenches and tensiometers and the like, which device is accurate over a very wide range for universal application, which may be manually operated or which may be operated through the agency of a force multiplying device, which is rugged in design and not apt to get out of order, and which is itself readily calibrated by means of simple tools.

In accordance with my invention I provide a master lever pivoted at one end to a base or frame and arranged to have forces applied thereto at any one of four different locations, each spaced a predetermined distance from the pivot or fulcrum. Torque applied through a rotary part at one of four stations is transmitted to the master lever by means of a crank and a link. The four stations provide a wide range of torque measurement. A rod pivotally connected to the master lever is arranged to operate a gage mechanism, and this gage mechanism is calibrated in units of torque. Pivotal movement of the master lever is thus reflected in a reading of torque measurement on the gage mechanism.

A preferred embodiment of my invention is shown in the accompanying drawings in which:

Figure 3 is a side elevation partly broken away along the line 3—3 as shown in Figure 2.

Figure 4 is a fragmentary view on an enlarged scale partly in section and showing details of the connections of the mechanisms at certain of the torque receiving stations and their connections with the master lever.

Figure 5 is a sectional elevation taken substantially on the line 5—5 as shown in Figure 4.

Figure 6 is a sectional view taken substantially on the line 6—6 as shown in Figure 4.

Figure 7 is a sectional view showing construction of the force multiplying or puller mechanism employed in connection with my invention.

Figure 8 is a sectional elevation partly broken away taken substantially on the line 8—8 as shown in Figure 3.

Figure 9 is a sectional detail taken substantially on the line 9—9 as shown in Figure 4.

Figure 10 is a sectional detail partly broken away taken substantially on the line 10—10 as shown in Figure 8.

Figure 11 is a perspective view showing the manner of adjustment of the location on the master lever of one of the tension applying mechanisms.

Figure 13 is a front elevation similar to Figure 1 showing the use of the device for testing the accuracy or calibrating a torque indicating wrench.

Figure 14 is a front elevation showing the manner of calibrating the instrument itself.

Figure 15 is a schematic diagram showing the general principle of operation of the device.

Figure 16 is a front elevation partly broken away showing the use of the force multiplying mechanism in calibrating a torque wrench.

Figure 1:
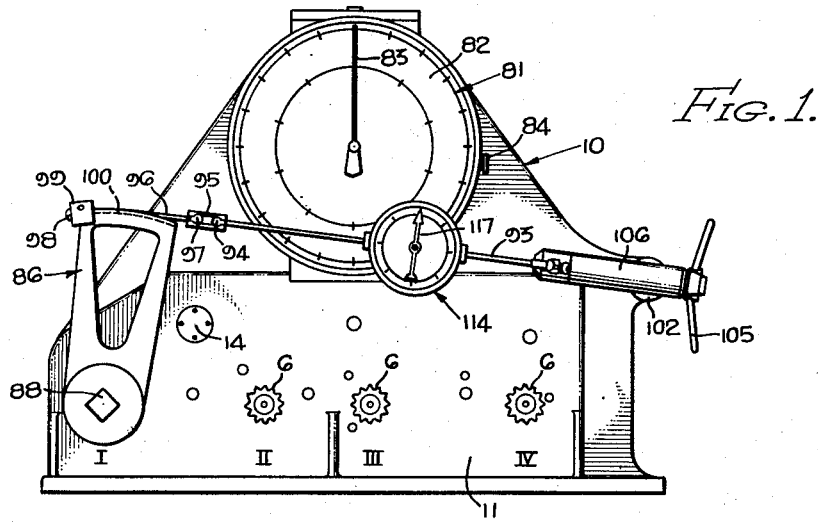
Figure 1 is a front elevation showing the device in use for checking the accuracy or calibrating a cable tensiometer.

Referring to the drawings, the frame 10 is provided with walls which form a housing 11 for a lever mechanism generally designated 12. The mechanism 12 includes a master lever 13 which is pivotally connected at one end to the frame 10 by means of the fulcrum pivot 14. A plurality of tension links 15, 16 and 17 are pivotally connected to the master lever 13 at locations spaced along its length. The connections between each of the links and the master lever 12 are substantially the same, and as illustrated in Figures 4 and 5 the master lever is provided with a recess 18 within which is positioned a hardened cylindrical pin 19 having its axis parallel to the axis of the fulcrum pin 14. The upper portion of the pin 19 projects above the upper surface of the master lever 13 and is engaged by an arcuate surface 20 formed on the lower portion of the pin 21 which connects the upper ends of the parallel link plates 17a. A pair of guide pins 22 are fixed on the master lever on opposite sides of each of the pins 21 to prevent accidental movement of the pin 21 away from the pin 19. The rocking bearing formed between the pins 19 and 21 provides a pivotal connection having a minimum of friction.

A plurality of crank members 23, 24 and 25 are each provided with laterally extending trunnions 26 which are rotatably mounted in axially aligned bearings provided on the frame 10. The trunnion 26 may be formed integrally with the crank members or may be provided on transverse shaft elements which are nonrotatably fixed with respect to the crank members. The bearings for the trunnions 26 may be plain cylindrical bearings 27 as shown in Figure 6 or may take the form of roller bearing assemblies 28 as shown in Figure 8. In the particular device shown in the drawings the roller bearings 28 are provided for the crank member 23, whereas plain cylindrical bearings 27 are provided for crank members 24 and 25.

Each of the trunnions 26 is provided with a central noncircular portion 3, a pair of cylindrical portions 4 on opposite sides of the noncircular portion 3, and noncircular end portions 5. The noncircular parts of each trunnion may be hexagonal if desired. The portions 5 extend outward beyond the side walls of the housing, and an externally splined collar 6 is detachably mounted on each of the portions 5. Each collar 6 is provided with a noncircular bore 7 for reception of the end portions 5 of the trunnions 26. The collars 6 are held in assembled relation with respect to the trunnions 26 by means of threaded elements 8 and retainers 9. Torque loads may be applied to the collars 6 on either side of the frame 10, and hence the right-hand tools as well as the left-hand tools may be tested and calibrated.

Figure 12:
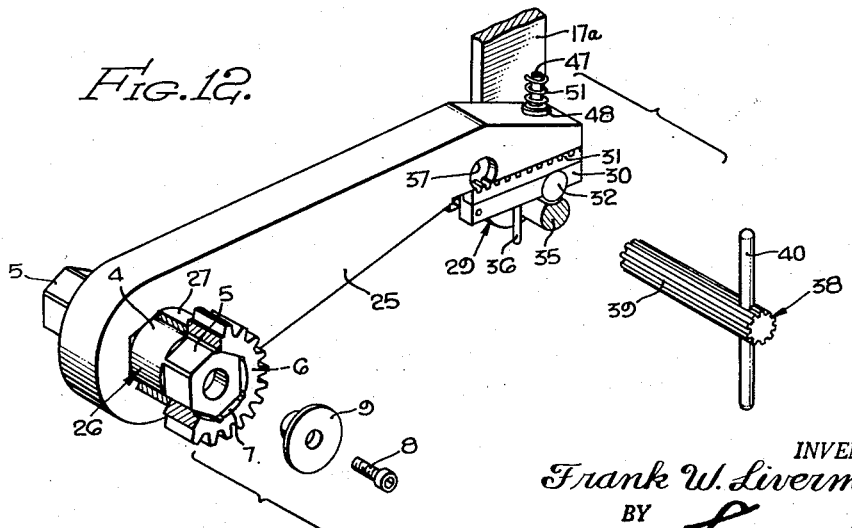
Figure 12 is a perspective view showing the manner of adjustment of the pivot location for one of the torque receiving cranks.

The links 15, 16 and 17 are pivotally connected through an adjustable mechanism 29 to the crank members 23, 24 and 25 respectively. The adjustable mechanism 29 is best shown in Figures 4 and 12 and includes a sliding plate 30 having rack teeth 31 formed along its upper side. The plate 30 is mounted for sliding longitudinal movement on the crank 25 and is guided for movement within the groove 33. A hardened cylindrical pin 32 having its axis parallel to the pin 19 is fixed on the sliding plate 30. The lower portion of this pin 32 projects below the collar 30 and contacts the arcuate surface 34 on the pin 35. The pin 35 extends between the link plates 17a. Downwardly extending guide pins 36 may be provided on the plate 30 to prevent accidental displacement of the pin 35 with respect to the pin 32. A cylindrical opening 37 is provided on the crank member 25. The tool 38 (Figure 12) is provided with axially extending teeth 39 which are adapted to mesh with the rack teeth 31. The tool 38 may be moved axially into the opening 37 to bring the teeth 39 into engagement with the rack teeth 31. Turning of the handle 40 then serves to move the plate 30 longitudinally of the crank member 25. A clamp bolt 41 is provided for locking the plate 30 in selected position. From this description it will be understood that the tool 38 may be used for moving the position of the pivotal connection between the link 17 and the crank member 25.

Resilient means are provided for maintaining the pins 19 and 21, and the pins 32 and 35 in contact. As shown in the drawings this means comprises a bar 42 having an integral flange 43 and a pointed end 44 received in a socket 45 provided in the master lever 13. The lower end of the bar is provided with an axial bore 46 for sliding reception of a cylindrical portion of the stem 47. The stem 47 is provided with an integral flange 48 and a pointed end 49 which is received within a socket 50 provided on the crank member 25. A coil spring 51 encircles the bar 42 and the ends of the spring engage the flanges 43 and 48. Similar devices are employed in connection with the crank members 23, 24 and 25.

At the extreme end of the master lever 13 removed from its fulcrum 14 there is provided a plate 52 which is mounted for sliding movement longitudinally of the master lever 13. As shown in Figures 4 and 6 this plate 52 fits within a groove 53 provided on the master lever 13. The plate 52 is provided with a rack 54 having teeth 55. A hardened cylindrical pin 56 has its axis parallel with the pin 19 and a portion of this pin extends above the upper surface of the plate 52. An arcuate surface 57 on the cross-member 58 rests on the extending portion of the pin 56. A cylindrical opening 59 is provided on the master lever 13 and the tool 38 shown in Figure 12 is adapted to be inserted axially into this opening 59 to bring the threads 39 into engagement with the rack teeth 55. The tool 38 may then be used to adjust the position of the plate 52 with respect to the master lever 13 and thereby adjust the position of the rocking bearing provided by the parts 56 and 58. A clamping bolt 60 is provided for clamping the plate 52 in selected position. Stationary pins 61 may be provided on the plate 52 to prevent accidental displacement of the parts 56 and 58.

The part 58 is provided with laterally spaced sockets 62 for reception of the end members 63 attached to opposite ends of the continuous flexible cable 64. As shown in Figures 4 and 6 the flexible cable 64 extends downward from the saddle part 58 and around a portion of the surface of the drum 65. The flexible cable 64 passes behind two parallel pins 66 which are fixed to the drum 65. The drum 65 is fixed on one of the trunnions 26 by means of set screw 68. The trunnion 26 is encircled by bearing sleeves 69 which in turn are received within the bushings or plain bearings 27. The torque applying collars 6 are mounted on the noncircular extending ends 5 of the trunnion 26. The outer peripheries of the collars 6 are provided with axial splines 74 for connection to torque applying devices.

Retainer means are provided to prevent accidental disassembly of the flexible cable 64 from the spooling drum 65. As shown in the drawings this retainer means includes radial pin 75 fixed on the drum 65. This radial pin 75 extends between the parallel line parts of the cable 64 and is provided with an arcuate piece 76 which is formed in the shape of an arc struck from the axis of the stub shaft 67. This curved piece 76 extends between the pins 66 and overlies that portion of the cable 64 which is parallel to the drum axis. When the spooling drum 65 is turned in a clockwise direction as viewed in Figure 4 the flexible cable 64 is spooled on the drum surface and the master lever 13 is caused to swing about its fulcrum in a clockwise direction. A sudden release of the torque load as applied to the drum 65 does not permit the flexible cable 64 to jump off the pins 66 because the arcuate retainer 76 prevents any considerable radial movement of the portion of the flexible cable extending between the pins 66. The radial pin 75 also serves as a stop piece to engage the stationary abutment pin 77 mounted on the frame 10. Engagement of the parts 75 and 77 limits turning movement of the drum 65 in a direction to unspool the cable 64.

The locations of the axes of the crank members 23, 24 and 25 and of the spooling drum 65 may be referred to as stations I, II, III and IV respectively as shown in Figures 1 and 15. A torque load applied at any one of these stations through the splined torque-receiving members 74 acts through the particular link or cable connection to swing the master lever 13 in a clockwise direction. This pivotal movement of the master lever 13 about its fulcrum 14 is transmitted through pin 78, clevis 79 and rod 80 to the gage mechanism generally designated 81. This gage mechanism 81 includes a dial face 82 and one or more indicating hands 83. The particular construction and internal mechanism of the gage 81 is described in my copending application Serial No. 241,681, filed July 26, 1951, now Patent No. 2,687,642. When the applied torque load is released, spring mechanism within the gage 81 returns the hands 83 to the initial or zero position. An adjusting screw 84 may be provided for adjusting the "zero" position of the hands 83.

The effective lengths of the crank members, the diameter of the drum 65, and the locations of the pivotal connections between the links and the cable along the length of the master lever 13 are so chosen that a direct dial reading is obtained at stations II and IV. At stations I and III the dial reading is multiplied by a factor of 10. With this arrangement a very wide capacity range for the device is achieved. Thus in a particular commercial form of the device and gage station I has a torque capacity of 100–7500 lb.-ft., station II has a torque capacity of 1–1000 lb.-ft., station III has a torque capacity of 100–10,000 lb.-in., and station IV has a torque capacity of 1–1000 lb.-in. The range in this commercial device thus permits measuring torques from 1 lb.-in. at station IV to 7500 lb.-ft. at station I.

As shown diagrammatically in Figure 15 the application of a torque load at any one of the stations I, II, III and IV serves to swing the master lever 13 in a clockwise direction about its fulcrum 14. This pivotal movement of the master lever 13 is communicated to the bar 80 which actuates the gage mechanism generally designated 81. The gage mechanism shown diagrammatically in Figure 15 illustrates how movement of the bar 80 may be utilized for swinging the pointer 83. Other forms of gage mechanisms may be employed without departing from the spirit of my invention.

The enclosure provided by the housing 11 for the linkage mechanism 12 protects the mechanism from damage and also excludes dust, dirt and other foreign matter. A removable plate 85 defines the lower limit of the enclosure.

Socket adapters 90 are provided with internal splines 91 for reception of the external splines 74 provided on the collars 6. The splines 91 terminate short of the ends 67 of the adapters 90 so that a short length counterbore 70 is provided on each adapter. This counterbore acts as a pilot when applied to the outer bevelled ends of the spline teeth 74 to center the adapter with respect to the collar 6 and thereby facilitate engagement of the spline teeth 91 and 74.

When it is desired to use the device for testing and calibrating a cable tensiometer a sector member 86 is mounted at station I. The sector member 86 may be provided with a noncircular stub shaft 88 held in position by set screw 89. The stub shaft 88 is received within the noncircular bore 92 in the adapter 90. A flexible cable 93 has one end 94 secured to a tension fitting 95. A short length cable 96 has one end 97 fixed to the same tension fitting 95 and the other end 98 fixed within a boss 99 provided on the sector member 86. The connection between the short length cable 96 and the sector member 86 is shown in Figure 10. An arcuate surface 100 on the sector member 86 forms part of a circle having its center at the axis of the crank 23.

Means are provided for tensioning the cable 93, and as shown in the drawings this means includes a transverse supporting shaft 101 which is mounted for turning movement within the boss 102 provided on the frame 10. The outer end of the shaft 101 is provided with a threaded bore 103 to receive the screw 104. A star wheel 105 is fixed to the screw 104 so that the latter may be turned manually. A shell 106 has an axially extending lateral slot 107 through which the shaft 101 extends. A thrust bearing 108 is mounted within the shell and receives axial load from the thrust collar 109 which is fixed to the screw 104 by means of set screw 110. Another bearing 111 is provided on the shell to receive the forward end of the screw 104. A socket 112 is provided at the forward end of the shell to receive the end 113 of the flexible cable 93. From this description it will be understood that manual turning of the star wheel 105 turns the screw 104 within the threaded opening 103 and thereby causes the shell 106 to move to the right as viewed in Figure 1 to tension the cable 93.

Figure 2:
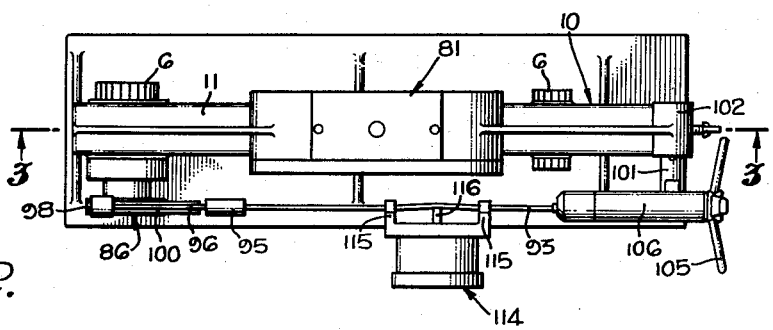
Figure 2 is a top plan view thereof.

A cable tensiometer 114 may be applied to the cable 93 in any convenient manner. As shown in Figure 2 the tensiometer 114 is provided with a pair of spaced brackets 115 which engage the cable 93 and a central movable plunger 116 which engages the cable 93 at a location between the brackets 115. Tensioning of the cable 93 serves to move the plunger 116 into the interior of the tensiometer. Calibration of the tensiometer is accomplished by turning the star wheel 105 to subject the cable 93 to increasing tension loads. A comparison of the readings provided by the tensiometer indicator hand 117 and the hands 83 of the gage 81 then provides a basis for calibration of the tensiometer 114. Since the shell 106 is mounted for pivotal movement with respect to the frame 10 the tension in the cable 93 causes the shell 106 to swing about its pivotal mounting so that the cable 93 and screw 104 are coaxial.

When it is desired to use the device for checking or calibrating a torque indicating wrench 120 as shown in Figure 13 the cable 93 is fastened about the handle of the wrench 120. The socket or other head of the wrench is applied to splined member 74 on the crank 23. The star wheel 105 is then turned to move the shell 106 to the right and thereby tension the cable 93. The readings of the gage 81 and dial 121 on the wrench may then be compared. Any one of a series of ball knobs 122 on the cable 93 may be gripped in the socket 112 of the shell 106. Various tension loads may then be applied to the cable, and it is unnecessary to bring the axis of the cable into position perpendicular to the line of action of the torque wrench 120 to check the reading of the wrench dial 121. The test may be conducted for various torque loads within the capacity range of the torque wrench. Torque wrenches of other types, for example, the signaling type shown in my prior Patent No. 2,400,205, issued May 14, 1946, may be tested or calibrated in a similar fashion. Torque wrenches of any of these types having smaller torque load capacities may be tested at stations II, III or IV.

The device embodying my invention may itself be readily calibrated in a direct manner. As shown in Figure 14 a bar 130 of known length may be attached at any one of the stations in a horizontal position. Known weights 131 are then applied to the outer end of the bar. In this way a known torque load is applied and the dial reading of the gage 81 should agree with this known torque load. If the dial reading is in error it may be corrected by inserting the adjusting tool 38 through one of the apertures 132 in the frame 10 to engage the rack teeth 31 or 55. Effective lengths of the cranks or master lever may thus be adjusted so that the gage 81 accurately reflects the torque load applied at any one of the stations.

It is often desirable to use the force multiplying mechanism as a pushing device for applying a load to a torque wrench. As shown in Figure 16 the shell 106 and star wheel 105 may be swung to a vertical position by turning the pivot shaft 101 within the boss 102. As thus positioned the star wheel may be rotated to move the shell 106 downward so that the lower end of the shell applies a side load directly against the torque wrench 140 or through an intermediate spacing block 141. The location of the force multiplying mechanism including the shell 106 and star wheel 105 with reference to the frame 10 is particularly advantageous because it enables this mechanism to be employed for checking low capacity as well as high capacity torque wrenches. Torque wrenches of low capacity would be tested at station IV, and such wrenches would ordinarily have short handles. Torque wrenches of higher capacity would be tested at stations II or III and would have correspondingly longer handles. A torque wrench of capacity sufficiently great for testing at station I would have a handle long enough so that the lower end of the shell 106 could be applied against it. The shell 106 is thus advantageously mounted on the side of the frame adjacent the low capacity stations.

Having fully described my invention, it is to be understood that I do not wish to be limited to the details herein set forth, but my invention is of the full scope of the appended claims.

I claim:

1. In a device for calibrating a torque wrench or the like, the combination of: a frame, a master lever, pivot means connecting one end of the master lever to the frame to provide a fulcrum, a plurality of crank members, bearing means on the frame turnably mounting the crank members for rotation about separate axes parallel to the axis of the fulcrum, the master lever and each of the crank members extending in the same direction, a plurality of tension links, pivot means connecting one end of each link to said master lever at locations spaced along the length of said master lever, means adjustable lengthwise of the master lever by stepless increments for operably connecting each of the crank members to one of the links, whereby the master lever and crank members turn in the same direction, each of the crank members having a portion extending coaxially of its respective bearing means accessible exteriorly of the frame through which a torque load may be applied to the crank member, and force measuring gage means on the frame operatively connected to the master lever and arranged to indicate pivotal movement thereof.

2. In a device for calibrating a torque wrench or the like, the combination of: a frame having walls providing a housing, a master lever within the housing, pivot means connecting one end of the master lever to the walls of the frame to provide a fulcrum, a plurality of crank members, bearing means on the frame turnably mounting the crank members for rotation about separate axes parallel to the axis of the fulcrum, the master lever and each of the crank members extending in the same direction, a plurality of tension links, pivot means connecting one end of each link to said master lever at locations spaced along the length of said master lever, means operably connecting each of the crank members to one of the links, whereby the master lever and crank members turn in the same direction, each of the crank members having a torque-receiving portion extending outside said housing coaxially of its respective bearing means, and force measuring gage means on the frame operatively connected to the master lever and arranged to indicate pivotal movement thereof.

3. In a device for calibrating a torque wrench or the like, the combination of: a frame having walls providing a housing, a master lever within the housing, pivot means connecting one end of the master lever to the walls of the frame to provide a fulcrum, a plurality of crank members, bearing means on the frame turnably mounting the crank members for rotation about separate axes parallel to the axis of the fulcrum, the master lever and each of the crank members extending in the same direction, a plurality of tension links, pivot means connecting one end of each link to said master lever at locations spaced along the length of said master lever by stepless increments, means adjustable lengthwise of the master lever for operably connecting each of the crank members to one of the links, whereby the master lever and crank members turn in the same direction, each of the crank members having a torque-receiving portion extending outside said housing coaxially of its respective bearing means, and force measuring gage means on the frame operatively connected to the master lever and arranged to indicate pivotal movement thereof.

4. In a device for calibrating a torque wrench or the like, the combination of: a frame, a master lever, pivot means connecting one end of the master lever to the frame to provide a fulcrum, a plurality of crank members, bearing means on the frame turnably mounting the crank members for rotation about separate axes parallel to the axis of the fulcrum, the master lever and each of the crank members extending in the same direction, a plurality of tension links, pivot means connecting one end of each link to said master lever at locations spaced along the length of said master lever, means adjustable lengthwise of the master lever by stepless increments for operably connecting each of the crank members to one of the links, whereby the master lever and crank members turn in the same direction, each of the crank members having a portion extending coaxially of its respective bearing means accessible exteriorly of the frame through which a torque load may be applied to the crank member, force measuring gage means on the frame, and a rod pivotally connected to the master lever and operatively connected to actuate the gage means.

5. In a device for calibrating a torque wrench or the like, the combination of: a frame, a lever member, means connecting one end of the lever member to the frame to provide a fulcrum, a crank member, bearing means on the frame turnably mounting the crank member for rotation about an axis parallel to the fulcrum axis, the lever member and the crank member extending in the same direction, a tension link, pivot means connecting one end of said link to said lever member at a location spaced from said fulcrum, additional pivot means operatively connecting the other end of the tension link to the crank member, whereby the members turn in the same direction, adjustment means on one of said members for shifting one of the pivot means longitudinally by stepless increments with respect to that member, a force measuring gage on the frame, and means operatively connected to the lever member for actuation of the gage.

6. In a device for calibrating a torque wrench or the like, the combination of: a frame, a lever member, means connecting one end of the lever member to the frame to provide a fulcrum, a crank member, bearing means on the frame turnably mounting the crank member for rotation about an axis parallel to the fulcrum axis, the lever member and the crank member extending in the same direction, a tension link, pivot means connecting one end of said link to said lever member at a location spaced from said fulcrum, additional pivot means operatively connecting the other end of the tension link to the crank member, whereby the members turn in the same direction, adjustment means on one of said members for shifting one of the pivot means longitudinally with respect to that member by stepless increments, said adjustment means including an element slidably mounted on said member and supporting the latter said pivot means, a force measuring gage on the frame, and means operatively connected to the lever member for actuation of the gage.

7. In a device for calibrating a torque wrench or the like, the combination of: a frame, a master lever, means connecting one end of the master lever to the frame to provide a fulcrum, a crank member, the master lever and the crank member extending in the same direction, bearing means on the frame turnably mounting the crank member for rotation about an axis parallel to the fulcrum axis, a tension link, pivot means connecting one end of said link to said master lever at a location spaced from said fulcrum, additional pivot means operatively connecting the other end of the tension link to the crank member, whereby the master lever and the crank member turn in the same direction, adjustment means on said crank member for shifting one of the pivot means longitudinally, said adjustment means including an element slidably mounted on the crank member and supporting the latter said pivot means, a force measuring gage on the frame, and means operatively connected to the master lever for actuation of the gage.

8. In a device for calibrating a torque wrench or the like, the combination of: a frame, a master lever, means connecting one end of the master lever to the frame to provide a fulcrum, a crank member, bearing means on the frame turnably mounting the crank member for rotation about an axis parallel to the fulcrum axis, the master lever and the crank member extending in the same direction, a tension link, pivot means connecting one end of said link to said master lever at a location spaced from said fulcrum, additional pivot means operatively connecting the other end of the tension link to the crank member, whereby the master lever and the crank member turn in the same direction, adjustment means on said crank member for shifting one of the pivot means longitudinally, said adjustment means including an element slidably mounted on the crank member and supporting the latter said pivot means, the slidable element having rack teeth thereon positioned for engagement by a gear-type tool, a force measuring gage on the frame, and means operatively connected to the master lever for actuation of the gage.

9. In a device for calibrating a torque wrench or the like, the combination of: a frame, a master lever, pivot means connecting one end of the master lever to the frame to provide a fulcrum, an adjustable element slidably mounted on the master lever for lengthwise adjustment movement thereon, a spooling drum turnably mounted on the frame and having a part thereon accessible exteriorly of the frame through which a torque load may be applied to the spooling drum, a saddle element pivotally mounted on said adjustable element, a continuous flexible cable attached to said saddle element and extending at least partially around said spooling drum, a force measuring gage on the frame, and means whereby the master lever may actuate the gage.

10. In a device for calibrating a torque wrench or the like, the combination of: a frame, a master lever, pivot means connecting one end of the master lever to the frame to provide a fulcrum, an adjustable element slidably mounted on the master lever for lengthwise adjustment movement thereon, a spooling drum turnably mounted on the frame and having a part thereon accessible exteriorly of the frame through which a torque load may be applied to the spooling drum, a saddle element pivotally mounted on said adjustable element, a continuous flexible cable having its ends attached to said saddle element and having parallel parts extending to the drum surface, the cable extending at least partially around said spooling drum, a force measuring gage on the frame, and means whereby the master lever may actuate the gage.

11. In a device for calibrating a torque wrench or the like, the combination of: a frame, a master lever, pivot means connecting one end of the master lever to the frame to provide a fulcrum, an adjustable element slidably mounted on the master lever for lengthwise adjustment movement thereon, means for securing said element in adjusted position on the master lever, a spooling drum turnably mounted on the frame and having a part thereon accessible exteriorly of the frame through which a torque load may be applied to the spooling drum, a saddle element pivotally mounted on said adjustable element, a continuous flexible cable having its ends attached to said saddle element and having parallel parts extending at least partially around said spooling drum, means preventing displacement of the cable from said spooling drum, a force measuring gage on the frame, and means whereby the master lever may actuate the gage.

12. In a device for calibrating a torque wrench or the like, the combination of: a frame, a master lever, pivot means connecting one end of the master lever to the frame to provide a fulcrum, an adjustable element slidably mounted on the master lever for lengthwise adjustment movement thereon, means for securing said element in adjusted position on the master lever, a spooling drum turnably mounted on the frame and having a part thereon accessible exteriorly of the frame through which a torque load may be applied to the spooling drum, a pair of radial pins on the drum, a saddle element pivotally mounted on said adjustable element, a continuous flexible cable having its ends attached to said saddle element and having parallel parts extending to the drum surface, the cable passing at least partially around said spooling drum and around said radial pins, a force measuring gage on the frame, and means whereby the master lever may actuate the gage.

13. In a device for calibrating a torque wrench or the like provided with a handle, the combination of: a frame, a master lever fulcrumed on the frame, a force measuring gage on the frame, means whereby the master lever may actuate the gage, a plurality of crank arms turnably mounted on the frame about separate axes parallel to the fulcrum axis, a plurality of tension elements each operatively connecting one of the crank arms to said master lever, the wrench being engageable with any one of said arms to apply a torque load thereto, a force multiplying mechanism pivotally mounted upon the frame, and a flexible cable for attachment to the wrench handle and adapted for connection with said mechanism.

14. In a device for calibrating a torque wrench or the like, the combination of: a frame, a force measuring gage on the frame, a master lever, means connecting one end of the master lever to the frame to provide a fulcrum, means connected to the master lever for actuation of the gage, a crank member having a laterally extending trunnion, bearing means on the frame turnably mounting the trunnion for rotation about an axis parallel to the fulcrum axis, means including a tension link connecting the crank member to said master lever, an externally splined element fixed on the trunnion exteriorly of the frame, said member having a series of external spline teeth, a torque applying socket having a series of internal spline teeth, the teeth terminating short of the end of the socket to provide a counterbore, the counterbore acting as a pilot to centralize the socket with respect to the said element to facilitate installation of the socket on said element in an axial direction.

15. In a device for calibrating a torque wrench or the like provided with a handle, the combination of: a frame, a master lever fulcrumed on the frame, a force measuring gage on the frame, means connected to the master lever for actuation of the gage, a crank arm turnably mounted on the frame about an axis parallel to the fulcrum axis, a tension link operatively connecting the crank arm to said master lever, the wrench being engageable with said arm to apply a torque load thereto, a force multiplying mechanism pivotally mounted upon the frame, and a flexible cable for attachment to the wrench handle and adapted for connection with said mechanism.

16. In a device for calibrating a torque wrench or the like provided with a handle, the combination of: a frame having walls providing a housing, a master lever fulcrumed on the frame within the housing, a force measuring gage on a frame, means connected to the master lever for actuation of the gage, a crank arm turnably mounted on the frame within the housing about an axis parallel to the fulcrum axis, a tension link operatively connecting the crank arm to said master lever, the crank arm having a portion extending exteriorly of said housing, the wrench being engageable with said portion of said arm to apply a torque load thereto, a force multiplying mechanism pivotally mounted for swinging movement upon the frame outside the housing, and a flexible cable for attachment to the wrench handle and adapted for connection with said mechanism.

17. In a device for calibrating a torque wrench or the like provided with a handle, the combination of: a frame, a master lever fulcrumed on the frame, a force measuring gage on the frame, means connected to the master lever for actuation of the gage, a crank arm turnably mounted on the frame about an axis parallel to the fulcrum axis, a tension link operatively connecting the crank arm to said master lever, the wrench being engageable with said arm to apply a torque load thereto, a force multiplying mechanism including a shaft pivotally mounted upon the frame and having a threaded opening, a screw received within said threaded opening, a nonrotary shell rotatably supported upon said screw, and a flexible cable for attachment to the wrench handle connected to said shell.

18. In a device for testing a cable tensiometer or the like, the combination of: a frame, a master lever fulcrumed on the frame, a force measuring gage on the frame, means connected to the master lever for actuation of the gage, a crank arm turnably mounted on the frame, a tension link operatively connecting the crank arm to said master lever, a sector member engageable with said arm to apply a torque load thereto, said arm having a spooling surface, a force multiplying mechanism pivotally mounted upon the frame, a flexible cable secured to the force multiplying mechanism and engaging the spooling surface of the sector member, the tensiometer being mounted on said cable.

19. In a device for calibrating a torque wrench or the like provided with a handle, the combination of: a frame, a force measuring gage on the frame, a master lever fulcrumed on the frame, means connected to the master lever for actuation of the gage, a plurality of crank arms each turnably mounted on the frame about separate axes parallel to the fulcrum axis, the master lever and each of said crank arms extending in the same direction, a tension link operatively connecting each crank arm to said master lever, whereby the master lever and crank arm turn in the same direction, the wrench being engageable with any one of said crank arms to apply a torque load thereto, a force multiplying mechanism including a shaft pivotally mounted upon the frame, said mechanism including screw and nut means, said mechanism including a movable element adapted to apply a side load to the wrench handle when the wrench is operatively connected to any one of said crank arms.

20. In a device for calibrating a torque wrench or the like provided with a handle, the combination of: a frame, a force measuring gage on the frame, a master lever fulcrumed on the frame, means connected to the master lever for actuation of the gage, a plurality of crank arms each turnably mounted on the frame about separate axes parallel to the fulcrum axis, a tension link operatively connecting each crank arm to said master lever, the wrench being engageable with any of said crank arms to apply a torque load thereto, a force multiplying mechanism including a shaft pivotally mounted upon the frame and having a threaded opening, a screw received within said threaded opening, a nonrotary shell rotatably supported upon said screw, the shell being adapted to apply a side load to the wrench handle when the wrench is operatively connected to any one of said crank arms.

References Cited in the file of this patent

UNITED STATES PATENTS

| Number | Name | Date |
|---|---|---|
| 1,443,927 | Pruaho | Jan. 30, 1923 |
| 2,336,838 | Bennett | Dec. 14, 1943 |
| 2,342,919 | Chapman | Feb. 29, 1944 |